United States Patent
Stoddard et al.

(10) Patent No.: US 9,435,359 B2
(45) Date of Patent: Sep. 6, 2016

(54) ADAPTIVE HYDRAULIC CYLINDER WITH FLOATING SEAL INTERFACE

(75) Inventors: Kenneth J Stoddard, Santaquin, UT (US); Jared M Mangum, Lehi, UT (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 775 days.

(21) Appl. No.: 13/371,504

(22) Filed: Feb. 13, 2012

(65) Prior Publication Data

US 2013/0205993 A1 Aug. 15, 2013

(51) Int. Cl.
| F16J 15/18 | (2006.01) |
| F15B 15/14 | (2006.01) |
| F04B 39/00 | (2006.01) |
| B60T 17/08 | (2006.01) |

(52) U.S. Cl.
CPC ......... *F15B 15/1466* (2013.01); *B60T 17/081* (2013.01); *F04B 39/0022* (2013.01)

(58) Field of Classification Search
CPC ................... B60T 17/081; F04B 39/0022
USPC ................... 92/109, 113, 114, 165 R
See application file for complete search history.

(56) References Cited

U.S. PATENT DOCUMENTS

| 3,353,352 A | 11/1967 | Gardner |
| 3,887,196 A * | 6/1975 | Renfrow ................. E21B 33/08 277/318 |
| 4,157,121 A | 6/1979 | Amtsberg et al. |
| 4,337,017 A | 6/1982 | Evenson |
| 4,478,137 A | 10/1984 | Clark |
| 4,944,215 A * | 7/1990 | Nimmo ............... F15B 15/1433 277/505 |
| 5,897,119 A | 4/1999 | McMillen |
| 8,051,657 B2 | 11/2011 | Kim |
| 2004/0065194 A1* | 4/2004 | Varetto et al. .................. 92/109 |
| 2005/0066655 A1* | 3/2005 | Aarestad et al. ............... 60/413 |
| 2010/0275774 A1* | 11/2010 | Clemens ......................... 92/187 |

FOREIGN PATENT DOCUMENTS

| CA | 2258237 A1 * | 7/2000 |
| CN | 202118026 | 1/2012 |

(Continued)

OTHER PUBLICATIONS

1st Office action for the equivalent Australian patent application No. 2013200736 issued on Mar. 20, 2014.

(Continued)

*Primary Examiner* — Nathaniel Weihe
*Assistant Examiner* — Daniel Collins
(74) *Attorney, Agent, or Firm* — Michael Stonebrook (57) ABSTRACT

In one possible implementation, a misalignment-tolerant hydraulic actuator, e.g., for a submersible hydraulic diaphragm insert pump (HDI), has a floating piston that can reciprocate while decoupled from collinearity with a cylinder barrel and a central feed rod that slides through a central axis of the piston. The floating seal can be integrated or provided by a separate insert and provides a pivotable interface between the piston and center rod, allowing these components freedom of motion to avoid elastic deformation, friction, power loss, and early wear when misalignment or transverse forces on an external end of the piston rod are present. Bearing placement can also be selected to eliminate over-constraint.

14 Claims, 7 Drawing Sheets

EXAMPLE IMPLEMENTATION OF CONSTRAINTS (56) References Cited

FOREIGN PATENT DOCUMENTS

| CN | 202118026 A | 1/2012 |
|---|---|---|
| EP | 1843048 | 7/2010 |

OTHER PUBLICATIONS

Second Examination Report issued in AU application 2013200736, 4 pages.

\* cited by examiner

EXAMPLE IMPLEMENTATION OF CONSTRAINTS

ADAPTIVE HYDRAULIC CYLINDER WITH FLOATING SEAL INTERFACE

BACKGROUND

Conventional hydraulic cylinders (hydraulic actuators, linear hydraulic motors) are mechanical devices that can provide reciprocating linear displacement power to submersible pumps, such as hydraulic diaphragm insert pumps (HDIs).

Figure 1:
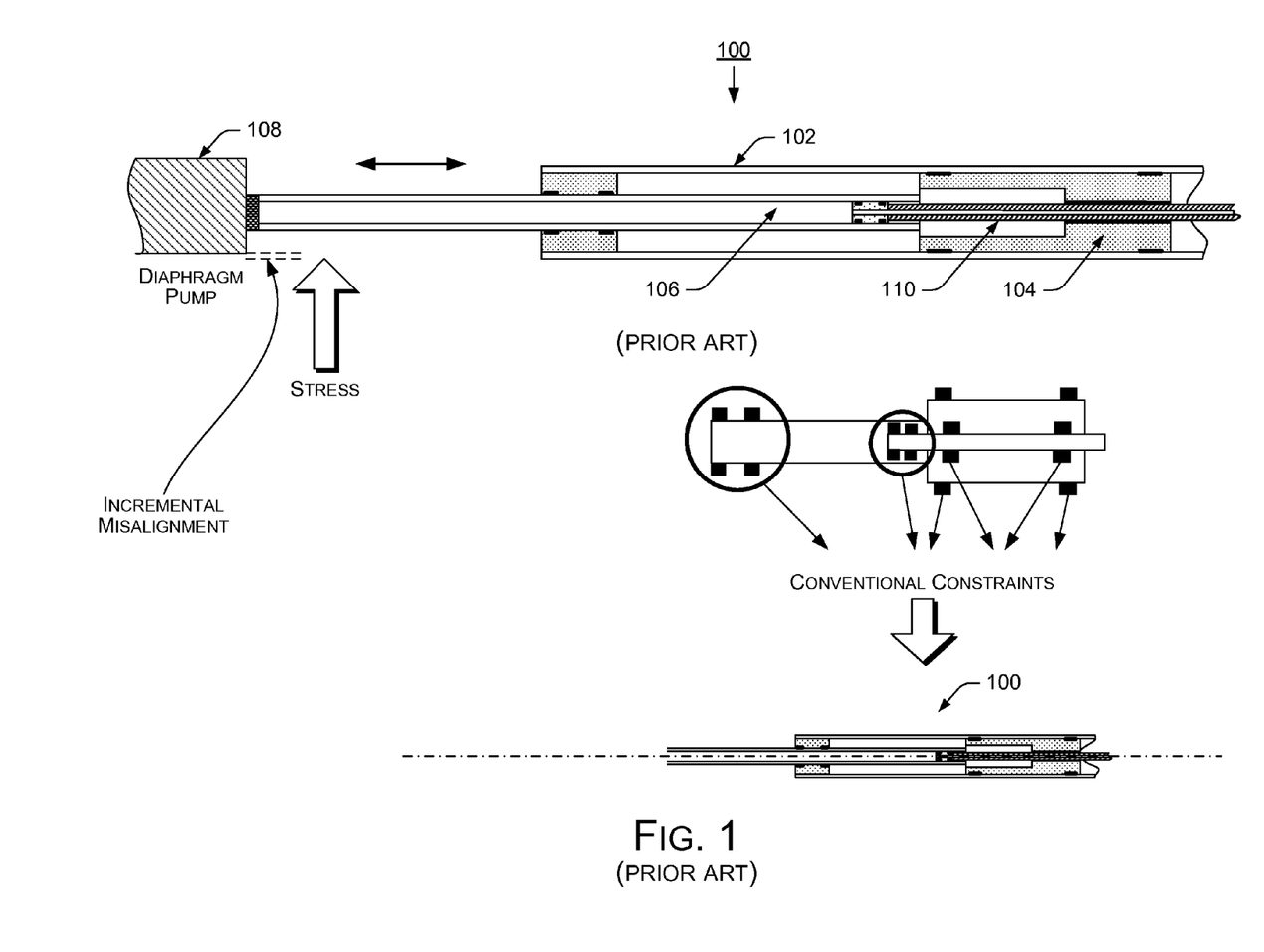
FIG. 1 is a diagram of a conventional, prior art, over-constrained hydraulic cylinder.

FIG. 1 shows a conventional hydraulic actuator 100 suitable for submersible pump applications. The conventional hydraulic cylinder 100 includes an outer cylinder piece known as the barrel 102, a sliding piston 104 inside the barrel 102, a piston rod 106 to transfer power from the piston 104 to an external submersible pump 108, and a central "feed" rod ("center rod") 110 that slides in a cylindrical hole through a central longitudinal axis of the piston 104. The center rod 110, since it passes through the piston 104, provides hydraulic fluid through a hollow bore to the far side of the piston for retraction.

In conventional designs, the piston 104, piston rod 106, center rod 110, and other moving parts are over-constrained to strict and unforgiving linear displacement with no tolerance for misalignment, resulting in extra load and efficiency loss as the components struggle against each other along conflicting axes, forcing some elastic deformation, friction, power loss, and early wear of the parts.

SUMMARY

An adaptive hydraulic cylinder with floating seal interface is provided. In an implementation, a deformation-tolerant hydraulic actuator, e.g., for a submersible hydraulic diaphragm insert pump (HDI), has a floating piston that can reciprocate while decoupled from strict collinearity with the cylinder barrel and the central feed rod that slides through the central axis of the piston. The floating seal can be integrated or provided by a separate insert and provides a pivotable interface between the piston and center rod, allowing these components some freedom of motion to avoid elastic deformation, friction, power loss, and early wear when misalignment or transverse forces on the external end of the piston rod are present. Bearing placement is also selected to eliminate over-constraint. Bearings on the piston, the floating seal interface, center rod and the piston rod support, for example, are placed singly or close together on each component to approximate a single contact ring that allows the components to self-adjust to different axes, while maintaining a hydraulic seal between all components.

This summary section is not intended to give a full description of an adaptive hydraulic cylinder with floating seal interface, or to provide a list of features and elements. A detailed description of example embodiments follows.

DETAILED DESCRIPTION

Overview

Figure 2:
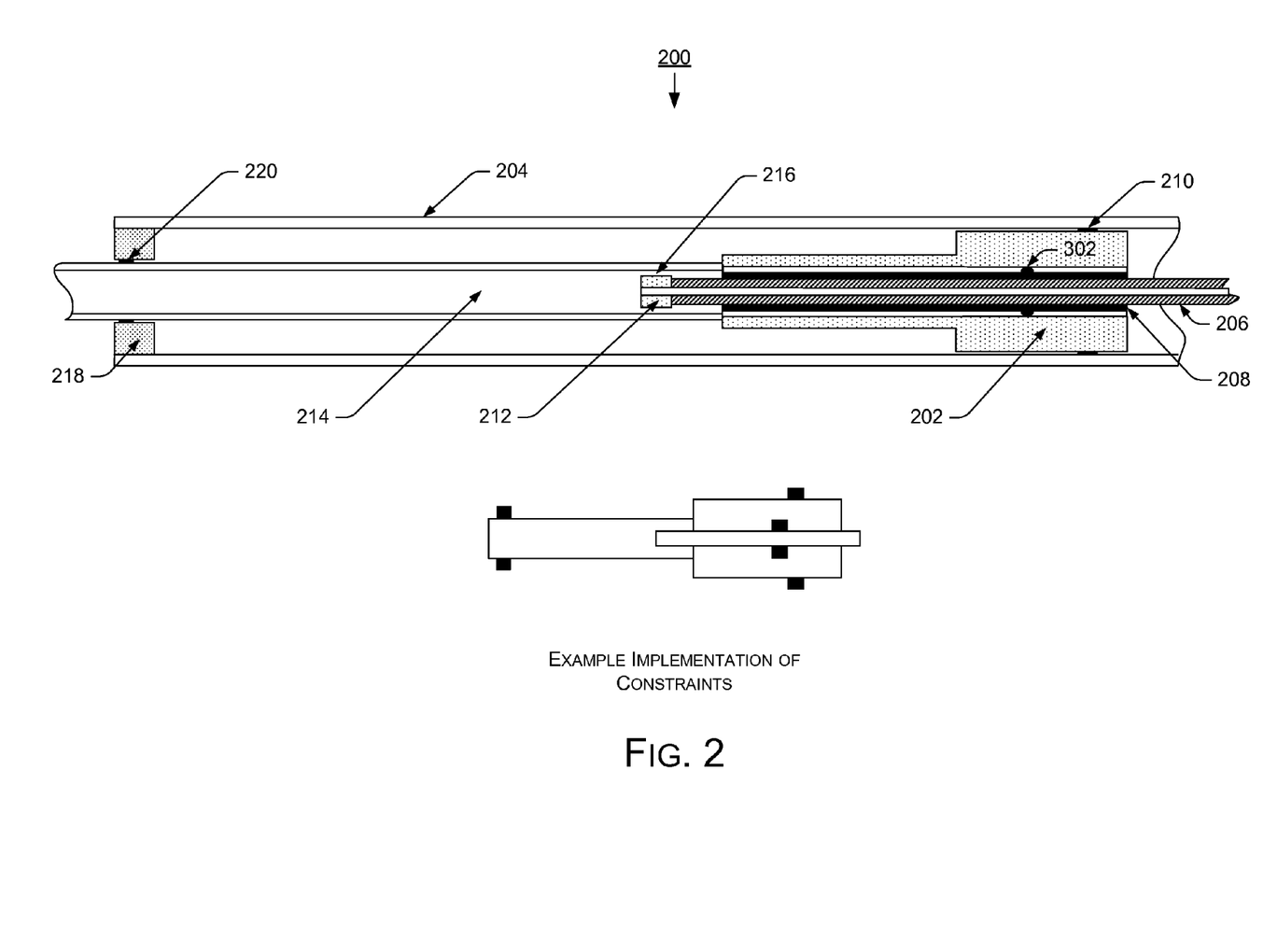
FIG. 2 is a diagram of an example adaptable hydraulic actuator with floating seal interface.

This disclosure describes an adaptive hydraulic cylinder with floating seal interface. FIG. 2 shows an example adaptive hydraulic actuator 200 (cylinder, motor) that is misalignment-tolerant and deformation-tolerant, and suitable for applications such as powering a submersible hydraulic diaphragm insert pump (HDI). The example hydraulic actuator 200 may be used for other devices besides an HDI and in other settings. FIG. 2 is a stylized diagram, for purposes of illustrating the components and the functions of the example hydraulic actuator 200. Other configurations and variations can also be used.

The example hydraulic actuator 200 has moving parts that are fully constrained by bearings and contacts between components for proper operation. But the components are not over-constrained to the point of having no tolerance for slight misalignment and slight elastic deformation under stress. The moving components can self-adjust their positions and/or their travel trajectories to a degree to adapt to misalignment forces, while maintaining proper operation and intact hydraulic seals throughout the hydraulic actuator 200.

Example Apparatus

The example hydraulic actuator 200 has a floating, but fully constrained piston 202, yet when stressed or affected by a misalignment in the component stack, the piston 202 can self-adjust to longitudinal axes other than the main central axis of the overall hydraulic actuator 200. That is, the piston 202 is not loose, but is free to move in directions and orientations besides the main direction of its displacement stroke while maintaining hydraulic seals in order to relieve binding forces and loading caused by misaligned or stressed parts. The longitudinal axis (or axes) of the piston 202 as it adapts may be different from the longitudinal central axis of the barrel 204 and different from the longitudinal central axis of the center rod 206 (these axes, the central longitudinal axis of the barrel 204 and of the center rod 206 may be the same axis, but not necessarily).

Figure 3:
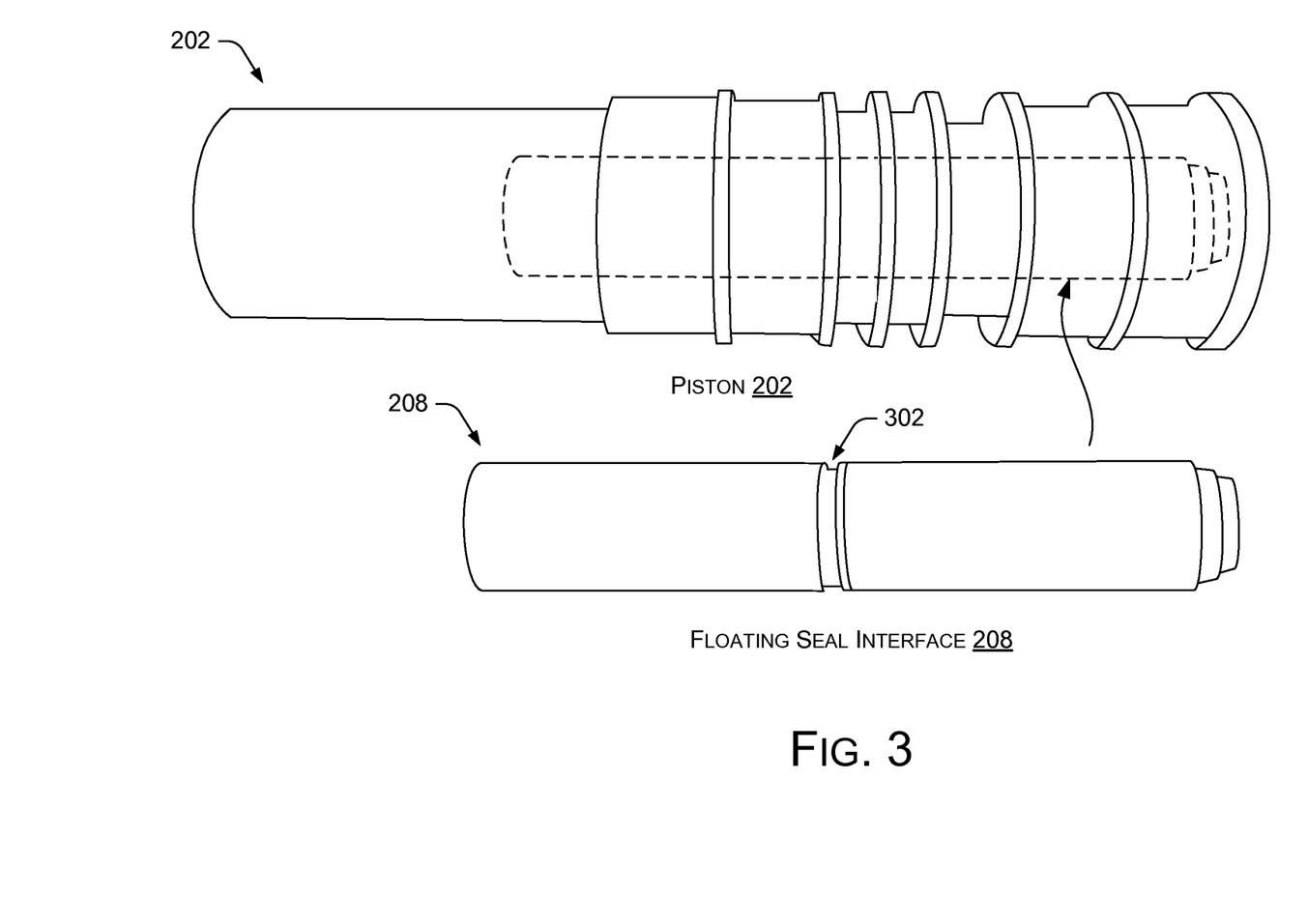
FIG. 3 is a diagram of an example piston and floating seal interface implemented as an insert.
Figure 4:
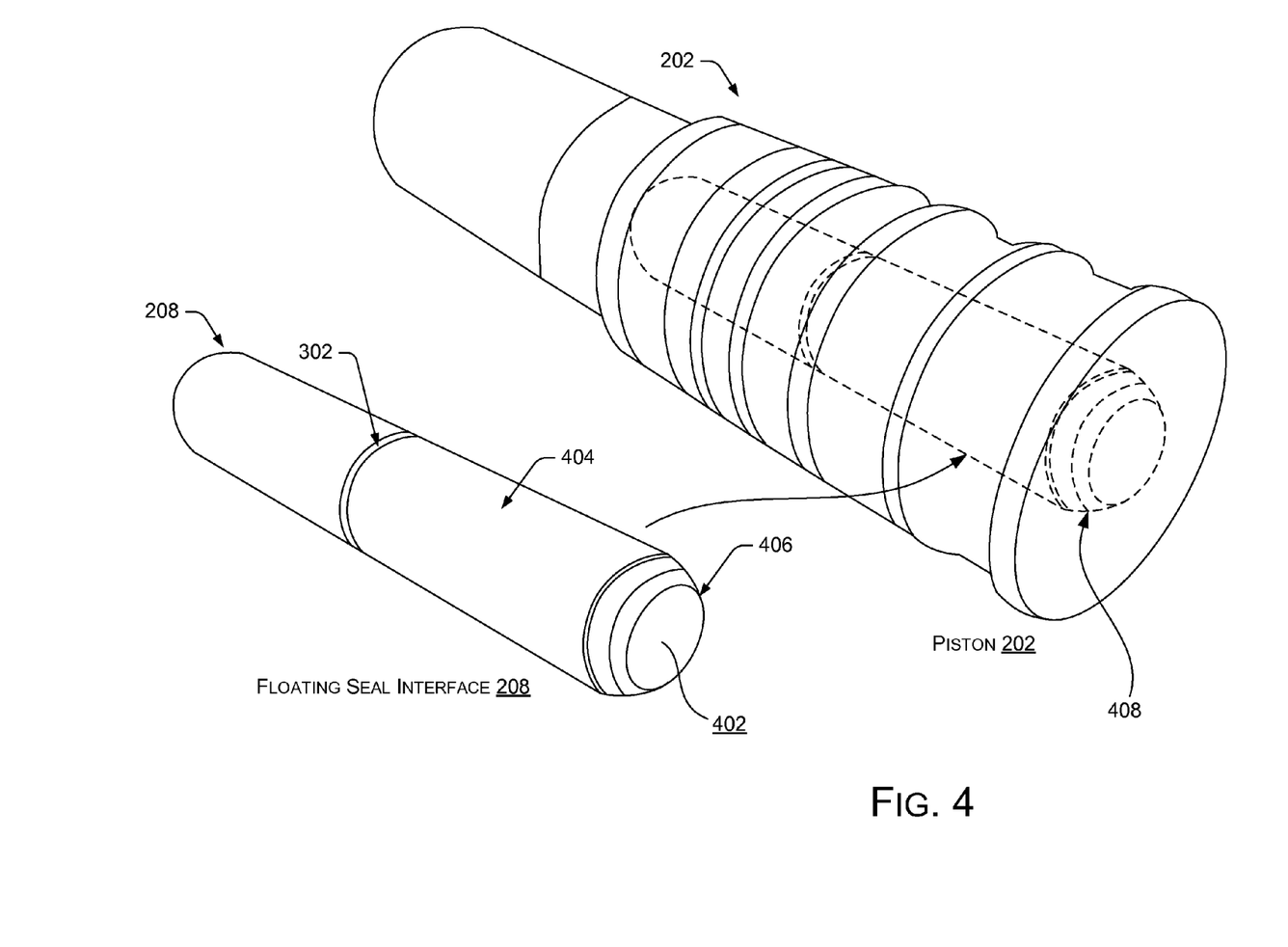
FIG. 4 is an elevation view of an example piston and floating seal interface implemented as an insert.

FIGS. 3-4 viewed in conjunction with FIG. 2, show an example implementation of the piston 202 and the floating seal interface 208, shown in this case as a separate insert. The floating seal interface 208 is integrated or fits soundly inside the piston 202 but with some tolerances that allow the piston 202 to decouple from the rigid constraint that is conventionally imposed by the center rod 206 around which the piston 202 slides. In FIG. 4, an inner bore 402 of the floating seal interface 208 makes a snug, closely-fitting bearing interface with the center rod 206 (e.g., metal-to-metal, polymer-to-metal, polymer-to-polymer, composite polymer, etc.) and makes a seal 408 with the piston cap. In one implementation, the outside surface 404 of the floating seal interface 208, however, does not make such a closely fitting bearing interface. Instead, a seal 302 provides an interface between the floating seal interface 208 and the piston 202 and in some implementations provides a pivot point or gimbal plane from which the piston 202 may adapt to misalignment forces. In one implementation, the seal 302 may be effected by a gland securing an O-ring, but many other types of seals may be utilized. The floating seal interface 208 and piston 202 interaction is relatively loose compared to the conventional interface machined to have no "give" between the cylindrical metal surfaces of the center rod 206 and the piston 202, and in one implementation the floating seal interface 208 may be loose enough to rattle when not pressurized by hydraulic fluid. This allows the piston 202 to "float," that is, allows the piston 202 several different degrees of freedom of motion with respect to the fixed center rod 206. The piston 202 floats in rotational and translational degrees of freedom with respect to the floating seal interface 208 (and thus with respect to the center rod 206). The forward edge of the floating seal interface 208 makes a seal 408 with the cap of the piston 202 when under pressure during a retraction stroke.

By a similar token, if the center rod 206 is out of alignment or stressed, the center rod 206 and the piston 202 can both "self-align" to relieve stress via the play allowed by the floating seal interface 208, whether the floating seal interface 208 is integrated into the piston 202, integrated into the center rod 206, or provided by a separate insert.

Figure 5:
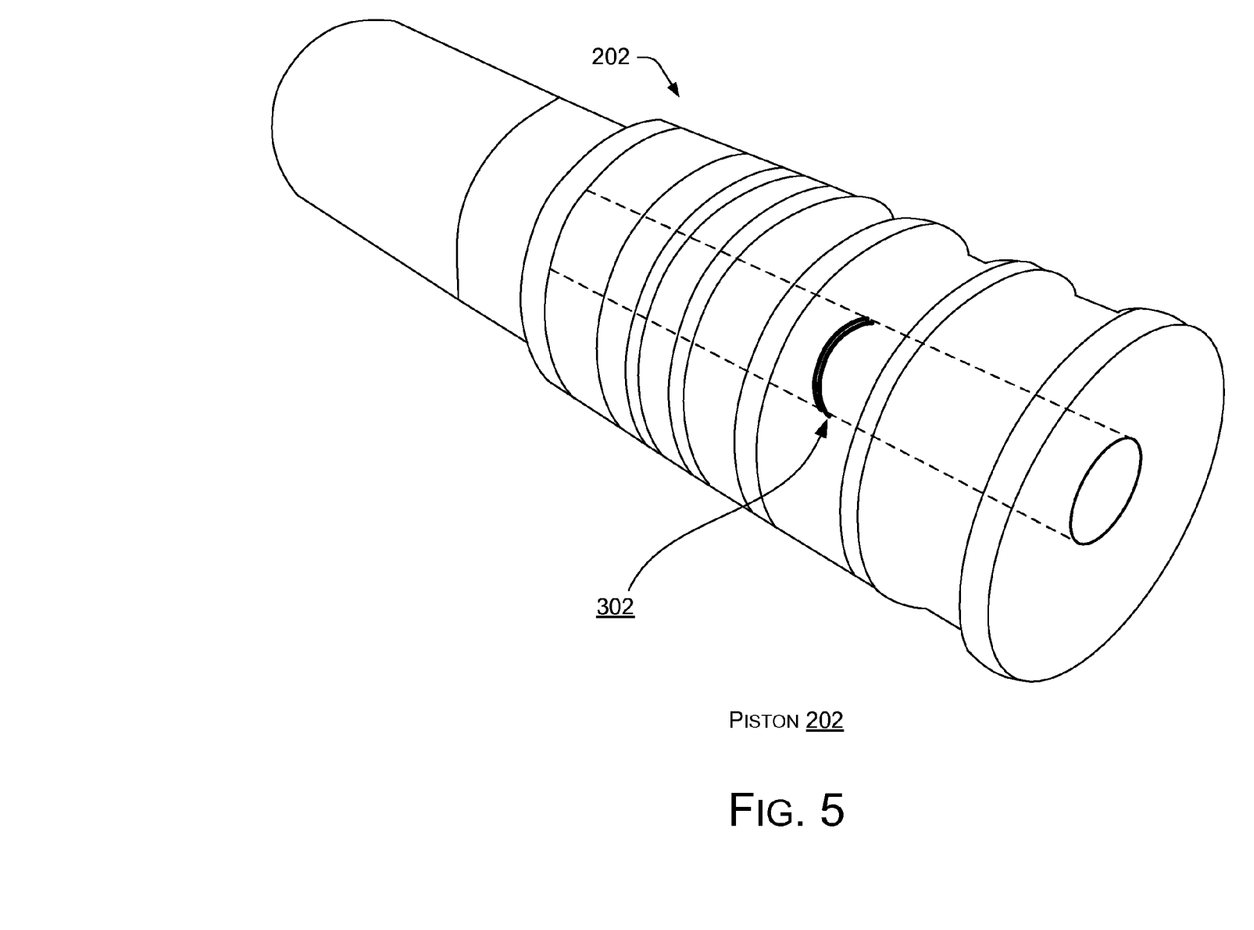
FIG. 5 is an elevation view of an example piston and integrated seal interface.

FIG. 5 shows a piston that has a floating seal interface 208 integrated into the fabric of the piston 202. That is, the floating seal interface 208 is not removable as a separate insert or other part. The integrated form of the seal interface 208 performs the same or equivalent functions in allowing degrees of movement as a removable insert implementation of the floating seal interface 208.

Figure 6:
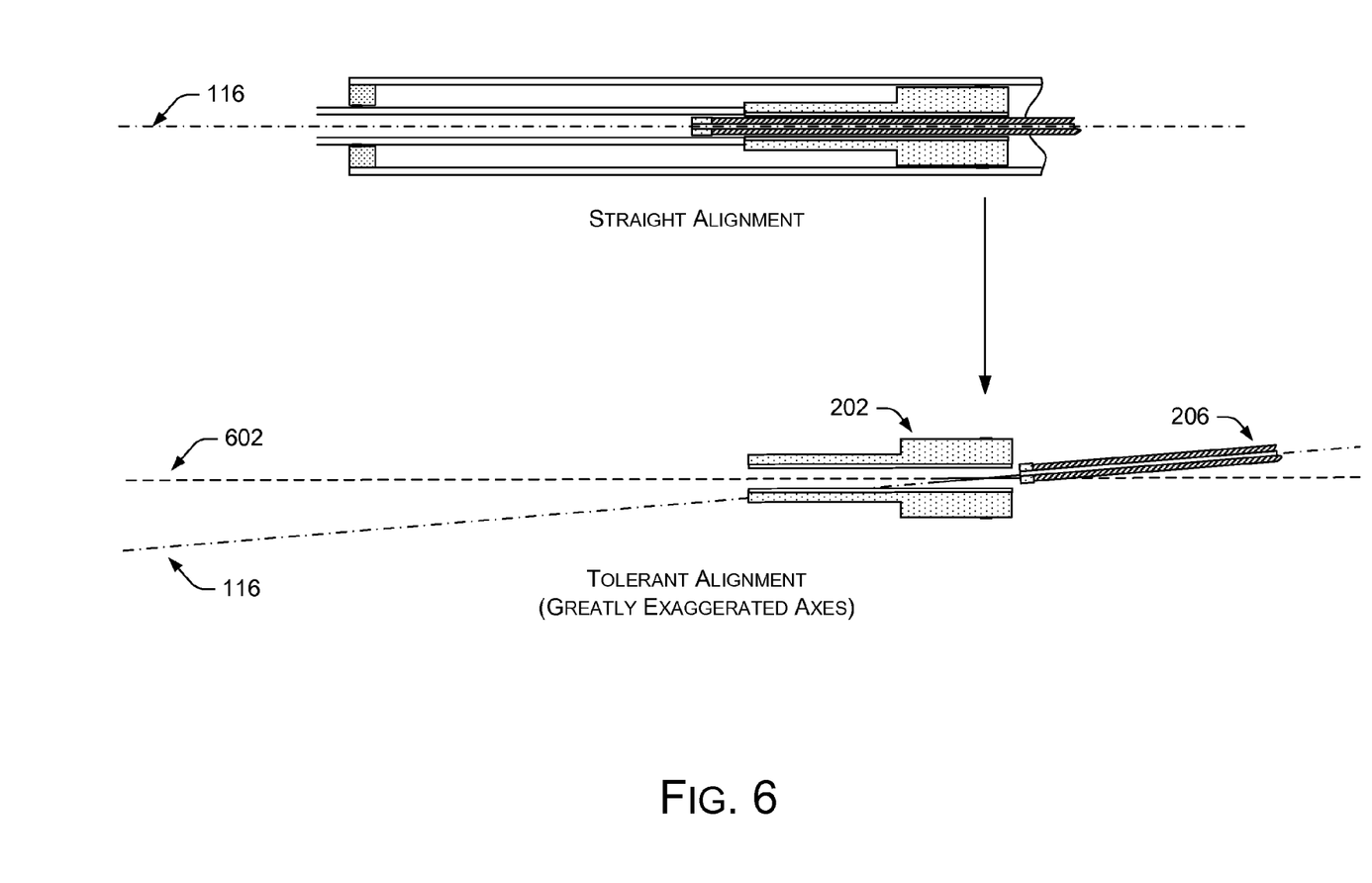
FIG. 6 is a diagram of an example floating piston self-adjustment along a new longitudinal axis.

FIG. 6 shows an example piston 202 (above) in normal "straight" alignment and in adaptive alignment (below), aligned with at least one component having a new, self-adjusted trajectory along an axis 116 that is different from the central longitudinal axis 602 of the example hydraulic actuator 200 (the illustrated deviation in axes is greatly exaggerated for purposes of description). In this example, the actual self-adjustment and deviation between the piston's axis 602 and the longitudinal axis 116 of the center rod 206 may be relatively small, even microscopic, but such exemplary self-adjustment is not possible in a conventional hydraulic cylinder because the parts are so over-constrained as to be rigidly fixed, except in the exact direction of intended travel. The self-adjustment capability of the example hydraulic actuator 200 allows the components to avoid binding forces, wear, and even seizing.

Returning to FIG. 2, in order for the piston 202 to self-adjust its comportment or stroke with respect to the other components using the advantages provided by the floating seal interface 208, the piston bearing 210 should also allow some play, since the conventional piston bearings 120 (FIG. 1) do not allow significant play. In an implementation, the center rod stop 212 has no contact 216 with the inner bore of the piston rod 214. In another implementation, the center rod stop 212 uses a seal and/or bearing that contacts the inner bore of the piston rod 214 as a single ring of contact instead of the conventional stable pair of seals, allowing the piston rod some degrees of freedom of movement from the linearity of the center rod 206 itself. A cylinder end cap 218 (terminal piston rod support 218, or end seal) may likewise use a support scheme with a bearing 220 that provides a single ring of contact with the piston rod 214 in order to allow the piston rod 214 to pivot slightly or deflect as needed, instead of the conventional separated pair of seals.

Figure 7:
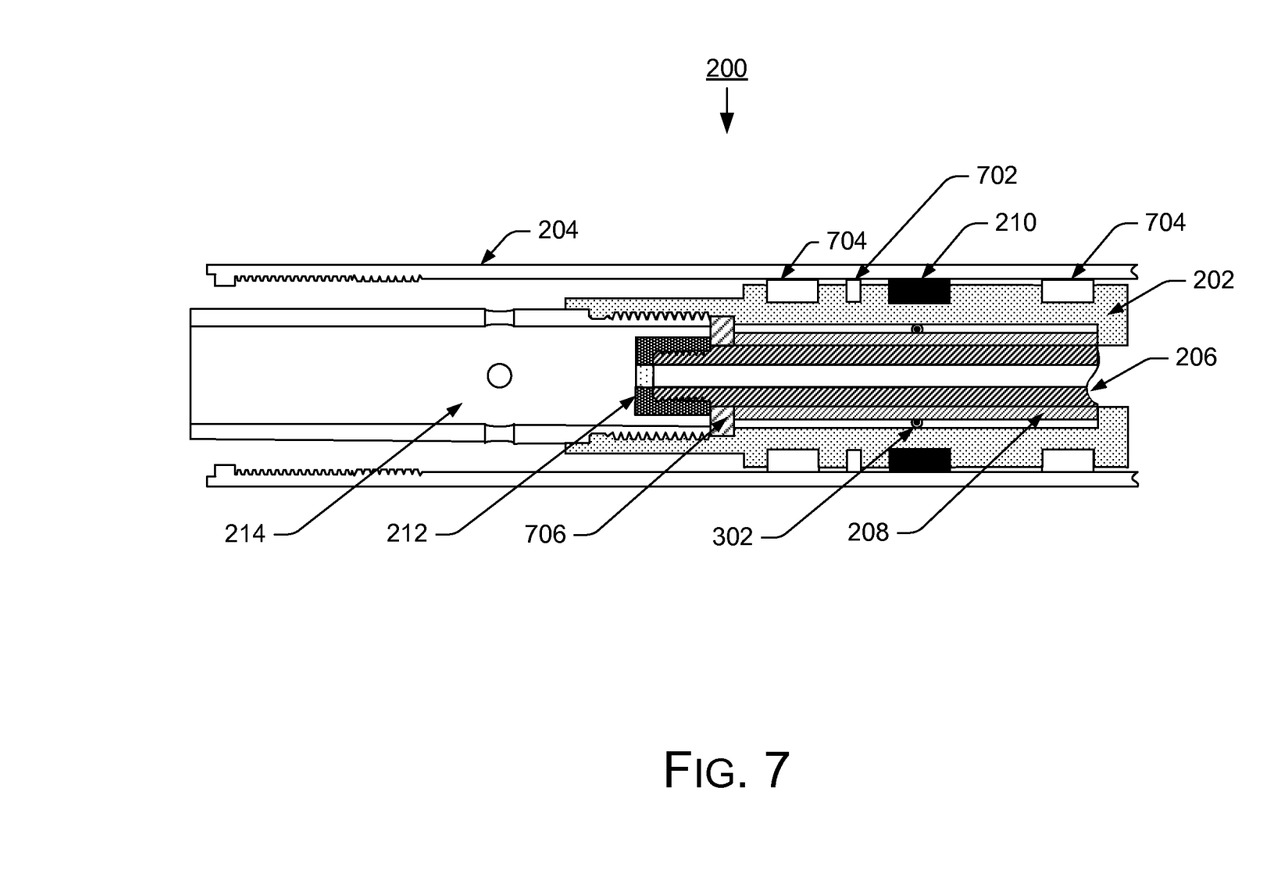
FIG. 7 is a cross-sectional view of an example adaptable hydraulic actuator with a floating seal interface.

FIG. 7 shows an example implementation of the hydraulic actuator 200. In this implementation, the example floating piston 202 slides within the barrel 204 of the hydraulic actuator 200, also pivotably sliding on the center rod 206, which has an inner lumen that feeds hydraulic fluid to the backside of the piston for a retraction stroke. The example floating seal interface 208 intervenes between the piston 202 and the center rod 206. The floating seal interface 208, when it is a separate insert, may be held in place longitudinally by a stop washer 706. The tolerance for slight movement and the ability to float may be achieved by many techniques. In one version, a seal provides a pivotable contact ring between the floating seal interface 208 and the piston 202.

Support for the floating piston 202 within the barrel 204 can be gathered into one single contact ring 210, such as a single bearing, so that the piston 202 can re-orient itself with respect to this single ring of contact 210. A piston seal 702 may also be present, and may be situated near the single contact ring 210 to make a group of rings, bearings, or seals that still act like a single ring of contact. To summarize, the ring of bearing support 210 is kept single when possible, and associated seals are drawn close to still maintain a single ring, or a short cylinder, of bearing support around the piston 202 so that the piston 202 may pivot and float as needed. Wipers or absorbers, such as ingestion rings 704 may also be present, but do not impede the self-adjustment of the piston 202. With the fully constrained but not over-constraining presence of the floating seal interface 208, the seal 302, and the single ring of bearing support 210 for the piston 202, the piston 202 is free to self-adjust in response to misalignment forces that would otherwise work to bind and seize the parts against each other.

Since the piston rod 214 is connected to the piston 202, it is also desirable to free the piston rod assembly from an over-constraining design. The center rod 206 has a center rod stop 212 that provides a physical stop for the piston 202 in its extension. The center rod stop 212 also has a hole to pass the hydraulic fluid from the lumen of the center rod 206 to the inner bore of the piston rod 214. The outside diameter of the center rod stop 212 may slide within the inner bore of the piston rod 214. In an implementation, the center rod stop 212 has no radial contact 216 with the inner bore of the piston rod 214, thus freeing the piston rod 214 from constraint by the center rod stop 212. In another implementation, the center rod stop 212 does slide with contact inside the inner bore of the piston rod 214, but the piston rod 214 is freed from over-constraint of the center rod stop 212 by shortening the length of the center rod stop 212 and/or by placing a single ring bearing around the center rod stop 212 (instead of multiple, separated support bearings or contact areas) so that the piston rod 214 can pivot, rotate, or otherwise adjust in relation to the center rod stop 212 present in its inner bore.

In each case where a single bearing or single ring of support is used to afford a component some additional degrees of freedom, the single or closely gathered bearings and seals can be modeled as one point of pivotable support (in a 2-dimensional cross-sectional model). In the example hydraulic actuator 200, the multiple constraints placed on the piston 202 have been replaced by a single constraint. The piston rod 214 and center rod stop 212 interaction is not over-constrained. And the piston 202 to barrel 204 interface is also fully constrained but not over-constrained. The center rod 206 sealing portion of the piston assembly is separated from the rest of the piston 202 and/or allowed to float in rotational and translational degrees of freedom. The seal between the piston 202 and the center rod 206 is distributed into a pivotable seal 302 along the longitudinal axis of the piston 202 and a seal 408 induced between the end of the floating seal interface 208 (when an insert is used) and the piston cap, when energized by differential pressure during the retraction stroke of the piston 202.

Thus, the design of the example hydraulic actuator 200 removes two couples (two independent and fixed cylindrical displacement trajectories) and replaces them with a single, properly constrained couple on the piston and piston rod assembly. The design inserts a rotational (primary) and translational (secondary) degree of freedom between the cylindrical displacement trajectory of the piston and piston rod assembly, and the floating seal interface 208 (integrated, or implemented as an insert). So no component in the stack is over-constrained, just fully constrained. All components thus interface with each other without excess loading.

CONCLUSION

Although exemplary systems have been described in language specific to structural features and/or methodological acts, it is to be understood that the subject matter defined in the appended claims is not necessarily limited to the specific features or acts described. Rather, the specific features and acts are disclosed as exemplary forms of implementing the claimed systems, methods, and structures.

The invention claimed is:

1. A hydraulic cylinder, comprising:
   a barrel;
   a piston slidably disposed within the barrel, the piston also being slidably disposed on a center rod within the barrel;
   a piston rod coupled to the piston, the piston rod having a hollow interior extending axially therethrough, the center rod having a rod stop through which fluid is delivered to the hollow interior of the piston rod, wherein the rod stop does not radially contact an interior surface of the piston rod;
   a first seal interface between the piston and the center rod to decouple a displacement axis of the piston from a longitudinal axis of the center rod; and
   a second seal interface between the piston and the barrel to decouple the piston from the barrel.

2. The hydraulic cylinder of claim 1, wherein the first seal interface enables the piston to move in rotational and translational degrees of freedom with respect to the center rod.

3. The hydraulic cylinder of claim 1, wherein the first seal interface comprises one of a separate floating insert member or a seal interface integrated with the piston.

4. The hydraulic cylinder of claim 1, wherein the first seal interface makes a self-lining bearing with the center rod; and the first seal interface also makes a hydraulic seal with the piston.

5. The hydraulic cylinder of claim 4, further comprising a gland in the seal interface placed to hold a seal at a pivot point to provide a freedom of movement of a longitudinal axis of the piston with respect to a longitudinal axis of the first seal interface.

6. The hydraulic cylinder of claim 1, further comprising a single ring of bearing support around the piston to allow a freedom of movement of a longitudinal axis of the piston with respect to the displacement axis of the piston in the cylinder.

7. The hydraulic cylinder of claim 1, further comprising:
   a piston rod support or cylinder endcap;
   a hole in the piston rod support or cylinder endcap for the piston rod;
   a bearing in the piston rod support or cylinder endcap to contact the piston rod in substantially a single ring of contact to provide a freedom of movement for a longitudinal axis of the piston rod with respect to a displacement axis of the piston in the cylinder.

8. The hydraulic cylinder of claim 7, wherein when the hydraulic cylinder operates, the cylinder, the piston, the piston rod, and the center rod are free to self-align on slightly differently near axes while remaining fully constrained without over-constraint, while maintaining a hydraulic seal between the components of the hydraulic cylinder.

9. A misalignment-tolerant hydraulic actuator for a submersible pump, comprising:
   a cylinder barrel;
   a piston in the cylinder barrel to provide a reciprocating stroke;
   a piston rod connected to the piston to transfer the reciprocating stroke from the hydraulic actuator to the submersible pump, the piston rod having an axial passage extending through the piston rod to deliver actuating fluid;
   a center rod disposed in a bore through a central axis of the piston, the center rod having a rod stop through which the actuating fluid is delivered to the axial passage of the piston rod, wherein the rod stop does not radially contact an interior surface of the piston rod;
   a first interface between the center rod and the piston to decouple a displacement axis of the piston in the cylinder barrel from a longitudinal axis of the center rod; and
   a second interface between the piston and the cylinder barrel to decouple the piston from the cylinder barrel.

10. The misalignment-tolerant hydraulic actuator of claim 9, wherein the first interface allows the piston and the center rod to slide in relation to each other along slightly differently linear axes without over-constraint while maintaining a hydraulic seal between the piston and the center rod.

11. The misalignment-tolerant hydraulic actuator of claim 9, further comprising:
    the first interface comprising a first pivotable bearing;
    the second interface comprising a second pivotable bearing; and
    wherein when the misalignment-tolerant hydraulic actuator operates, the cylinder barrel, the piston, and the center rod are free to self-align on slightly differently linear axes without over-constraint while maintaining a hydraulic seal between the components of the misalignment-tolerant hydraulic actuator.

12. The misalignment-tolerant hydraulic actuator of claim 11, further comprising:
    a stop on the center rod to move within a hollow bore of the piston rod; and
    wherein when the misalignment-tolerant hydraulic actuator operates, the cylinder barrel, the piston with piston rod, and the center rod are free to self-align on slightly different linear axes without over-constraint while maintaining a hydraulic seal between the components of the misalignment-tolerant hydraulic actuator.

13. The misalignment-tolerant hydraulic actuator of claim 9, wherein the first interface decouples a linear axis of reciprocation of the piston from a longitudinal axis of the center rod without introducing a constraint between the piston and the center rod.

14. The misalignment-tolerant hydraulic actuator of claim 9, wherein the first interface enables the piston to freely move and self-position in rotational and translational degrees of freedom with respect to the center rod.

* * * * *